US012571531B2

(12) United States Patent
Sandri et al.

(10) Patent No.: US 12,571,531 B2
(45) Date of Patent: Mar. 10, 2026

(54) ELONGATE LUMINAIRE WITH AN END CAP AND A SEALING FUNCTION

(71) Applicant: Zumtobel Lighting GmbH, Dornbirn (AT)

(72) Inventors: Laura Sandri, Dornbirn (AT); Christoph Schwaiger, Hard (AT); Emanuel Spiegel, Lustenau (AT)

(73) Assignee: Zumtobel Lighting GmbH, Dornbirn (AT)

( * ) Notice: Subject to any disclaimer, the term of this patent is extended or adjusted under 35 U.S.C. 154(b) by 0 days.

(21) Appl. No.: 18/837,756

(22) PCT Filed: Apr. 18, 2023

(86) PCT No.: PCT/EP2023/060017

§ 371 (c)(1),
(2) Date: Aug. 12, 2024

(87) PCT Pub. No.: WO2023/208657

PCT Pub. Date: Nov. 2, 2023

(65) Prior Publication Data

US 2025/0146659 A1 May 8, 2025

(30) Foreign Application Priority Data

Apr. 28, 2022 (DE) ..................... 20 2022 102 292.5

(51) Int. Cl.
*F21V 31/00* (2006.01)
*F21S 4/28* (2016.01)
(Continued)

(52) U.S. Cl.
CPC .............. *F21V 31/005* (2013.01); *F21S 4/28* (2016.01); *F21V 15/015* (2013.01); *F21V 17/18* (2013.01); *F21Y 2115/10* (2016.08)

(58) Field of Classification Search
CPC ...... F21V 31/005; F21V 15/015; F21V 17/18; F21S 4/28
See application file for complete search history.

(56) References Cited

U.S. PATENT DOCUMENTS 10,222,052 B1 3/2019 Ter-Hovhannisyan
11,255,521 B1 * 2/2022 McCane .............. F21V 7/0008
(Continued)

FOREIGN PATENT DOCUMENTS

CN 207796728 U 8/2018
DE 202016102334 U1 8/2017
(Continued)

OTHER PUBLICATIONS

PCT/EP2023/060017, International Search Report and Written Opinion dated Jul. 18, 2023, 12 pages and English translation, 7 pages.

*Primary Examiner* — Christopher E Dunay
(74) *Attorney, Agent, or Firm* — Andrus Intellectual Property Law, LLP

(57) ABSTRACT

An elongate luminaire (1) extending along a longitudinal axis (X) has a luminaire body (2) which delimits a luminaire interior (I) for receiving lighting means. The luminaire body (2) has: an elongate channel profile element (3) with a longitudinally extending light passage opening (30). A luminaire cover (4) is arranged in the light passage opening (30) along elongate contact regions (K) in order to surround the luminaire interior (I) together with the channel profile element (3) in a radially laterally circumferentially closed manner. An end cap (5) completely covers an end-side opening (20) in the luminaire body (2) towards the luminaire interior (I). A three-dimensionally and integrally formed seal (7) is between the end cap (5) and the luminaire body (2) has: a first sealing portion (71) for circumferentially closed axial sealing between the luminaire body (2) and the end cap
(Continued)

(5), and a second sealing portion (72) for radially sealing the contact regions (K) from the outside.

29 Claims, 5 Drawing Sheets

(51) Int. Cl.

| | |
|---|---|
| ***F21V 15/015*** | (2006.01) |
| ***F21V 17/18*** | (2006.01) |
| *F21Y 115/10* | (2016.01) |

(56) References Cited

U.S. PATENT DOCUMENTS

| | | | | |
|---|---|---|---|---|
| 2015/0345754 | A1* | 12/2015 | Sohn | F21V 17/12<br>362/217.05 |
| 2017/0101046 | A1* | 4/2017 | Beiwen | B60Q 1/0483 |
| 2020/0072449 | A1* | 3/2020 | Kim | F21V 3/02 |
| 2024/0247770 | A1* | 7/2024 | Sanichar | F21V 17/164 |
| 2025/0075867 | A1* | 3/2025 | Codabux | F21V 23/002 |

FOREIGN PATENT DOCUMENTS

| | | | |
|---|---|---|---|
| EP | 2395278 | A2 | 12/2011 |
| JP | 2021026903 | A | 2/2021 |

* cited by examiner

ELONGATE LUMINAIRE WITH AN END CAP AND A SEALING FUNCTION

CROSS-REFERENCE TO RELATED APPLICATION

The present application is the U.S. national stage application of international application PCT/EP2023/060017 filed Apr. 18, 2023, which international application was published on Nov. 2, 2023 as International Publication WO 2023/208657 A1. The international application claims priority to German Patent Application No. 20 2022 102 292.5, filed Apr. 28, 2022.

TECHNICAL FIELD OF THE INVENTION

The present invention relates to an elongate luminaire with an elongate luminaire body with end-side end caps.

BACKGROUND OF THE INVENTION

Elongate luminaires of the type described above are generally known. These often have an elongate luminaire body, which has an elongate profile element along with a luminaire cover received therein and extending along its longitudinal axis, in order to radially delimit in a surrounding manner a luminaire interior for receiving lighting means. The end-side openings of the luminaire body are often covered with end caps in order to close off the luminaire interior. The luminaire cover can, for example, be an elongate luminaire cover with an elongate light passage region and sealing protrusions extending on both sides with respect to the longitudinal axis. When the luminaire cover is inserted into the profile element, the sealing protrusions come into an equally holding and sealing contact with said profile element. Such a luminaire cover can be cut to length as required to match the length of the profile element. The luminaire cover can be designed to be so flexible that it can be rolled up in the non-installed state, i.e., when provided loose.

The sealing of the known luminaires is often ensured by powder coating, which is applied as the final work step after the assembly of the end caps to the luminaire body, for example. In this respect, the end caps must already be assembled by the manufacturer prior to the powder coating, which results in increased assembly and production costs. In addition, it is no longer possible to cut the luminaire body to length or to size at a later date, since this would nullify the sealing effect provided by the powder coating. Ultimately, the lengths of the corresponding luminaires are therefore delimited by the length variants offered by the manufacturer and can no longer be individually adjusted afterwards.

In order to achieve the best possible seal by means of powder coating, the abutting surfaces of the end cap and profile element must also be planed prior to assembly, in order to achieve the most uniform contact surface possible without gaps. In addition, the quality of the powder coating is subject to method-related fluctuations and aging effects, as a result of which a durable and secure sealing transition—particularly with respect to higher IP protection classes—between the end cap and profile element cannot be ensured.

Furthermore, the powder coating cannot absorb any mechanical play—in particular in the direction of the longitudinal extension of the luminaire—which can lead to a possible failure of the sealing, in particular when the luminaires are used in regions with fluctuating ambient temperatures, since the individual components of the luminaire are often made of different materials with different coefficients of thermal expansion.

SUMMARY OF THE INVENTION

It is therefore an object of the present invention to provide an elongate luminaire of the type mentioned at the beginning which allows a simple to provide and durably secure (sealing) seal with simultaneously simple and flexible assembly.

This object is achieved by the subject matter of the independent claim. The dependent claims develop the central idea of the present invention in a particularly advantageous manner.

According to a first aspect, the present invention relates to an elongate luminaire which extends along a longitudinal axis. The luminaire has an elongate luminaire body which extends along the longitudinal axis and delimits an (elongate) luminaire interior for receiving lighting means. The luminaire body has an elongate channel profile element which extends along the longitudinal axis and radially laterally circumferentially delimits the luminaire interior apart from a longitudinally extending light passage opening. The channel profile element can thus preferably have an annular cross section that is open (on one side) when viewed in the direction of the longitudinal axis, which is open with respect to its cross section (only) in the region of the light passage opening. The luminaire body also has an elongate luminaire cover for the passage of light from the lighting means arranged or to be arranged in the luminaire interior. The luminaire cover is arranged in the light passage opening along elongate contact regions, in order to surround the luminaire interior together with the channel profile element in a radially laterally circumferentially closed manner. The luminaire also has an end cap that completely covers an end-side (thus, preferably an axial) opening of the luminaire body towards the luminaire interior. The luminaire also has a three-dimensionally and integrally shaped seal, which is provided between the end cap and the luminaire body for sealingly covering the luminaire interior. The seal has a first sealing portion for a circumferentially closed axial (sealing) seal between the luminaire body and the end cap with respect to the longitudinal axis. The seal also has a second sealing portion for a radially (sealing) seal of the contact regions from the outside with respect to the longitudinal axis.

Since the sealing of the luminaire according to the invention is provided by a separate seal, this can be designed to meet the requirements in any desired and targeted manner; this is independent of a powder coating of the channel profile element, for example. For example, a planing of the end regions of the channel profile element or the luminaire cover is not necessary or not necessary to the same extent as before, since the separate seal can sometimes absorb a significantly larger play. The quality of the (sealing) seal can also be adjusted as required and improved or increased compared to a (sealing) seal by means of powder coating. In particular, defined and even higher IP protection classes can be achieved. Preferably, an IP protection class for the elongate luminaire of, for example, IP 54 and higher can be achieved.

The elongate luminaire according to the invention also makes it possible to provide a (sealing) seal between the end cap and the channel profile element of a luminaire described at the beginning in a flexible and simple manner, for example on-site at the customer's location. Due to the defined seal provided, the luminaire body can, for example, be cut to length by individually cutting the channel profile element or luminaire cover to length without any loss in the sealing of the luminaire, even after production—for example at the installation site. Overall, the length of the elongate luminaire can be selected as required directly at the use site by stringing together a plurality of channel profile elements or cutting them or individual channel profile elements to a desired dimension. In this manner, an increased degree of common part utilization can be achieved, since a modularly usable part can replace a plurality of previously necessary individual parts through the described individual adaptation.

In this manner, the production and assembly effort is reduced, since the end cap does not need to be pre-assembled at the factory; for example, prior to powder coating. This leads to significant overall cost and time savings in the manufacturing process. In addition, a high degree of luminaire diversity can be achieved despite the small variety of parts, since the luminaire only has to be adapted to the conditions and requirements at the use site. And with a more effective sealing effect.

Within the framework of the invention, "radial" and "axial" always refer to the longitudinal axis, unless otherwise stated; this preferably according to their orientation in the relevant region of the luminaire.

The longitudinal axis can preferably extend in a straight line; the luminaire is thus a linear luminaire. However, it is also conceivable that the longitudinal axis extends in a different manner, for example in a wavelike or single or multiple angled, two-dimensional or three-dimensional manner, and the like.

The luminaire preferably also has a fastening means for connecting and preferably releasably connecting the end cap to the luminaire body, preferably its channel profile element. Thus, the end cap can be securely fastened to the luminaire body. In addition, the seal provided between the end cap and the luminaire body can also be held securely in between.

The fastening means can extend parallel to the longitudinal axis. In this manner, the fastening means can be used in a space-saving and effective manner.

The fastening means preferably has a fastening direction parallel to the longitudinal axis. This makes it possible to clamp the first sealing portion axially to a defined extent between the end cap and the luminaire body with a defined force, in order to achieve a defined sealing effect and, in particular, preferably to maintain it durably during use of the luminaire.

The fastening means can preferably be guided through a fastening region of the seal and preferably of the first sealing portion. In this manner, the fastening means can serve as a kind of position holder for the seal both in the non-assembled or non-clamped state and in the assembled or clamped state.

The fastening region can preferably surround the fastening means in a radially sealing manner, so that the sealing is easily and durably maintained regardless of the fastening means. This also allows a particularly compact design, since the fastening means can easily be provided within a sealed region.

The fastening region preferably has a defined passage opening for the fastening means to pass through. In this manner, the correct positioning of the seal can be checked. In addition, the correct fastening position can be made visible by means of the fastening means. The passage openings provided in this manner can also serve to position the seal relative to the end cap or luminaire body in a more simple and secure manner.

The passage opening can preferably have a diameter d that is smaller than a diameter D of the fastening means. This allows a secure sealing of the fastening means by means of the fastening region.

The fastening means can preferably be a screw, thereby allowing a simple fastening with common and inexpensive but secure fastening means.

The first sealing portion can preferably have a closed annular shape and preferably radially surround the longitudinal axis in a closed manner. In this manner, the seal can be provided with as little material as possible, but still with an effective seal.

The first sealing portion preferably has a shape corresponding to the cross-sectional shape of the luminaire body in the region of the end-side opening. Thus, a highly effective and secure seal can be provided. In addition, the comparable shape makes it easier to achieve an intuitively correct assembly.

Preferably, the first sealing portion extends substantially in one plane (or in a plurality of planes), and thus has a particularly simple but effective design. This plane or planes is/are preferably oriented perpendicularly to the longitudinal axis or preferably extend parallel to a plane or planes spanned by the end-side opening or the adjacent portion (thus, the end side) of the channel profile element, so that a tight-fitting and thus highly effective seal can be provided with a simple structure. By "substantially in a (plurality of) plane(s)," it is understood that the first sealing portion basically extends in the plane(s), wherein this can have sealing portions protruding axially from the plane(s) corresponding to the sealing contour of the end cap and the luminaire body (the end-side ends of the channel profile element and the luminaire cover defining the end-side opening); these can, for example, connect the regions of the first sealing portion lying in the plurality of planes to one another in a closed manner.

The first sealing portion and the second sealing portion can preferably be connected to one another via a pivot portion so that they can pivot relative to one another. Thus, the two sealing portions can be moved relative to one another in a defined manner, in order to be optimally adapted, positioned and sealingly applied during assembly in accordance with their sealing direction and therefore sealing function. The pivot portion can, for example, be provided via a material reduction, such as a longitudinal groove.

A pivot axis of the pivot portion can preferably be oriented perpendicularly to the longitudinal axis. Thus, for example, the second sealing portion can be pivoted towards the luminaire body during assembly in a simple manner and thus securely placed.

The second sealing portion can preferably project from the first sealing portion towards the luminaire body and partially overlap the luminaire body laterally on the outside, thus extend axially in the installed state or project axially from the first sealing portion accordingly. The seal is thus provided at defined regions, in order to generate its sealing effect there efficiently and highly effectively.

In the uninstalled or non-assembled state of the seal, the second sealing portion can project at an angle towards the outside and away from the first sealing portion (thus preferably projecting radially and axially). With respect to an installed state of the seal, this means that the second sealing portion basically runs at an angle to the longitudinal axis and therefore at an angle to an installed state of the second sealing portion and thus towards the outside at an angle away with respect to the luminaire body. In this manner, an assembly of the seal is easily possible, for example by initially arranging and preferably clamping the first sealing portion between the end cap and the luminaire body, and then guiding or applying the second sealing portion for the final radial (sealing) seal of the contact regions. This prevents the second sealing portion from being inadvertently pinched or kinked during assembly. Furthermore, this design allows an easy demolding of the seal if it is produced using an injection molding process. The angles between the first and second sealing portions can be defined as required. If the defined pivot portion described above is also provided, an easy to produce, easy to assemble and highly effective seal can be provided.

The second sealing portion can be provided on at least one (outer) side of the luminaire body having the luminaire cover. Thus, the second sealing portion can be provided securely and easily in the contact region.

The second sealing portion can preferably extend circumferentially with respect to the longitudinal axis, spanning at least the luminaire cover and the adjacent contact regions. Thus, the second sealing portion can be provided in a defined manner on an exposed region of the luminaire body or the luminaire and, in particular, thus also effectively overlapping or sealing the contact regions.

The second sealing portion preferably has at least one sealing lip projecting towards the luminaire body, which extends at least partially around the longitudinal axis. The sealing lips provided in this manner increase the sealing function of the seal, since they allow a secure and simple adaptation to the surface to be sealed over the entire length; this is due to their given flexibility. This allows a high level of protection against splash water, for example.

The sealing lips can preferably run at least partially at an angle to the longitudinal axis. In this manner, for example, splash water can be directed in a targeted manner and preferably away from the luminaire body more rapidly.

The sealing lip is preferably designed with mirror symmetry with respect to a symmetry plane having the longitudinal axis and centrally intersecting the second sealing portion. This simplifies the production of the seal and uniformly provides the sealing function.

The sealing lip can preferably extend between the contact regions in such a way that it is increasingly spaced from the first sealing portion as the distance to the contact regions increases. Preferably, the sealing lip can be shaped like an arrow pointing away from the first sealing portion. This makes it possible, for example, to divert splash water uniformly and in a targeted manner to both sides of the luminaire body, and thus to reliably achieve a secure sealing effect even for higher IP protection classes.

The second sealing portion can preferably have a plurality of sealing lips, which are provided in a plurality of rows arranged axially one behind the other. This redundant arrangement of sealing lips in rows allows a particularly high sealing effect, even for higher IP protection classes.

The second sealing portion can preferably have protrusion portions that sealingly project between the channel profile element and the luminaire cover in the region of the relevant contact regions. In this manner, the corresponding contact regions can also be sealed in a targeted manner in order to achieve an overall high sealing effect. For example, the penetration of creeping water in the contact regions, i.e., in a region between the channel profile element and the luminaire cover, can be prevented. For example, if the second sealing portion is provided to pivot to the first sealing portion, the protrusion portions can be inserted securely and in a defined manner into the corresponding contact regions when the second sealing portion is placed against the luminaire body, in order to thus create a particularly high-density contact.

The protrusion portions can preferably project when viewed in the direction of the longitudinal axis on both sides of the second sealing portion and/or on both sides of the luminaire cover, preferably towards the luminaire interior. This allows a simple structure of the seals—in particular the second sealing portion—while at the same time a defined and targeted sealing function is provided.

The luminaire can also have a contact portion, which presses the second sealing portion towards the luminaire body, preferably at least radially. While the first sealing portion can be sandwiched between the end cap and the luminaire body and thus simply clamped for secure (sealing) seal, the contact portion also provides a means to similarly sandwich the second sealing portion, which lies in a different extension or sealing plane than the first sealing portion, against its sealing contact surface, and thus provides a high sealing clamping force. Thus, the seal can be provided in the two (sealing) planes described above in a highly effective and efficient, as well as secure and durable manner.

The contact portion can preferably be held on the end cap; this is preferably releasable. The contact portion can therefore be easily provided and is also automatically and correctly placed during assembly via the end cap, in order to develop its effect. This also prevents assembly errors. The releasable bracket also allows assembling the contact portion and just as easily removing it for maintenance purposes, while the sealing effect can still be ensured on a durable basis.

The end cap can also have a holding means in order to hold the contact portion accordingly. The holding means can be a latching spring in order to hold the contact portion in a correspondingly latching and also preferably releasably latching manner. The holding means or the latching spring can preferably be made of spring steel. The holding means or the latching spring can preferably be screwed, latched or otherwise fastened to the end cap. The holding means or the latching spring can also be integral with the end cap. This allows a simple provision of the contact portion—for example, by simply latching it into the locking spring—which significantly simplifies the assembly of the luminaire to achieve a secure sealing effect.

In an alternative embodiment, the contact portion can also be designed integrally with the end cap, as a result of which the number of parts is reduced.

The contact portion can preferably be designed as an angle with an axially extending contact leg for pressing the second sealing portion towards the luminaire body. The angle can also have a preferably substantially radially extending holding leg for holding the contact portion on the end cap, preferably via the holding means. In addition, due to the angled shape, the contact portion can be provided with two legs that are effective according to their function, as a result of which the contact forces acting on the seal, for example, can also be securely absorbed in the end cap, in order to effectively durably maintain the sealing effect.

The contact portion can preferably be made of sheet metal (for example, as a stamped-bent part) or plastics material (for example, as an injection-molded part). Thus, the contact portion can be optimally provided according to its intended use, complexity, and other similar factors.

The contact portion or, if present, at least its contact leg can completely cover the second sealing portion or at least the region of the seal facing the same side as the luminaire cover towards the outside. Thus, a particularly good and high sealing function can be achieved by means of the contact portion due to the full-surface overlapping contact. In addition, the contact portion can also be used in order to conceal the sealing region towards the outside and thus enhance the aesthetic appearance of the luminaire.

The end cap can preferably have structural portions facing the luminaire body, in order to hold the seal on the end cap by positive and/or frictional locking. This allows a correct seating of the seal for a secure assembly in an operationally safe manner. In addition, the handling of the end cap and seal can be simplified during assembly. The structural portions can be provided, for example, by or in addition to the fastening means. The structural portions can be used to achieve good alignment and positioning of the seal.

The seal is preferably made of silicone. This material can be used to provide a highly effective seal. This can also be easily produced. In addition, by means of a silicone seal, a secure (sealing) seal, even with high manufacturing tolerances, to achieve higher IP protection classes can be provided.

The channel profile element can have a substantially U-shaped cross section when viewed in the direction of the longitudinal axis. Thus, a comparatively simple form of the channel profile element can be provided. This can be easily produced, easily assembled and also provided in an aesthetically pleasing manner.

The light passage opening can preferably extend longitudinally over the entire length of the channel profile element. For example, this is preferably the case with the substantially U-shaped cross-sectional design of the channel profile element, wherein the light passage opening is then provided in a manner laterally delimited by the two side legs of the U. On the one hand, the channel profile element can be easily provided. On the other hand, the largest possible light transmission opening and thus a large light emitting surface can be provided. In particular, a channel profile element provided in this way can be used, for example, to implement a so-called light strip, with which a continuous light strip of substantially any length can be implemented by lining up a plurality of channel profile elements. The continuous light passage opening can then be covered by a continuous or a plurality of individual luminaire covers in rows.

The channel profile element and/or the luminaire cover are preferably connected along the elongate contact regions in a sealing and preferably also load-bearing manner. In this manner, the luminaire body can be produced securely and easily and also allows an automatically provided sealing function directly when inserting the luminaire cover into the channel profile element. It may also be possible to dispense with additional fastening means in order to hold the luminaire cover in the channel profile element, so that the overall number of parts can be reduced and the assembly effort can be reduced.

The luminaire cover can preferably have fastening profiles which extends along its length for sealing contact and preferably a load-bearing connection to the channel profile element. The fastening profiles are preferably designed integrally with the luminaire cover, for example in a two-component injection molding process. The luminaire cover can have a central light passage region, which is laterally delimited in a flanking manner by two longitudinally extending fastening profiles. Thus, the connection between the luminaire cover and the channel profile element can be further simplified while at the same time automatically providing a secure and simple sealing function between these elements in order to achieve any desired IP protection class, for example IP 54, depending on the design. If the luminaire cover as a whole is made of a flexible material, it can be produced as an endless strip, for example, and preferably rolled up and sent to the use site, where it can then be unrolled as required and cut to length as desired and in a manner corresponding to the channel profile element.

BRIEF DESCRIPTION OF THE DRAWINGS

Further features, advantages and embodiments of the present invention will now be described with reference to the drawings of the accompanying figures. In the drawings.

DETAILED DESCRIPTION OF THE EXEMPLARY EMBODIMENT

Figure 1:
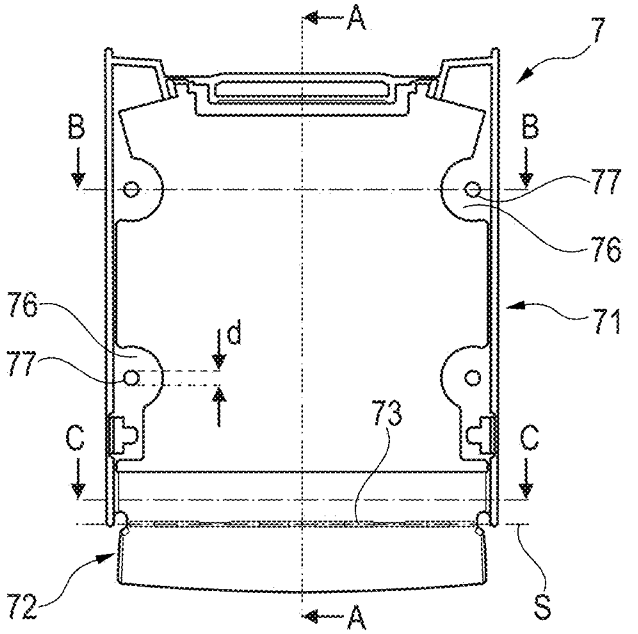
FIG. 1 is a frontal front view of a seal for an elongated luminaire according to a first exemplary embodiment of the present invention.

The figures show an exemplary embodiment of an elongate luminaire 1 according to the invention along with components thereof and detailed views. The elongate luminaire 1 extends along a longitudinal axis X, as shown by way of example in FIG. 8-15. In the exemplary embodiment shown here, the longitudinal axis X extends in a straight line; the luminaire 1 is thus a linear luminaire. However, it is also conceivable that the longitudinal axis X extends in a different way, for example in a wavelike or single or multiple angled, two-dimensional or three-dimensional manner, and the like.

The luminaire 1 has a luminaire body 2, as shown in FIG. 8-15. The luminaire body 2 delimits a luminaire interior I for receiving lighting means (not shown here). The lighting means can be any type of lighting means, in particular LED lighting means (for example, LED modules).

The luminaire body 2 has an elongate channel profile element 3 which extends along the longitudinal axis X, as can also be seen in FIG. 8-15. The channel profile element 3 radially laterally circumferentially delimits the luminaire interior I apart from a longitudinally extending light passage opening 30. The light passage opening 30 can preferably extend longitudinally over the entire length of the channel profile element 3, as can be seen in FIG. 8-15.

As can be seen from FIGS. 8, 10, 12 and 14, the channel profile element 3 can preferably have a substantially U-shaped cross section when viewed in the direction of the longitudinal axis X. As shown here, the channel profile element 3 can have a base portion 31 along with side walls 32 extending away on both sides of the base portion 31, which form the U-shaped cross section and radially laterally delimit the luminaire interior I accordingly.

The luminaire body 2 also has an elongate luminaire cover 4 for the passage of light from the lighting means received in the luminaire interior I. The luminaire cover 4 is arranged in the light passage opening 30 along elongate contact regions K, in order to surround the luminaire interior I together with the channel profile element 3 in a radially laterally circumferentially closed manner, as shown by way of example in FIGS. 8, 10, 12 and 14. The channel profile element 3 and the luminaire cover 4 can be connected along the elongate contact regions K, preferably in a sealing manner and more preferably also in a load-bearing manner. As can be seen in particular from FIGS. 8, 10, 12 and 14, the luminaire cover 4 can have fastening profiles 40 which extends along its length for sealing contact and preferably a load-bearing connection to the channel profile element 3. The fastening profiles 40 preferably flank an intermediate light emission region 41 on both sides, which preferably extends over the entire length of the luminaire cover 4. The fastening profiles 40 also preferably extend over the entire length of the luminaire cover 4. As shown, the fastening profile 40 can have an elongate web 42 projecting towards the luminaire interior I and a contact protrusion 43 projecting laterally towards the outside from the web 42 and back towards the light passage opening 30. The contact protrusion 43 can be designed in the form of a lip and thus serve as a sealing lip, for example. Likewise, the contact protrusion 43 can latch into a corresponding profile portion 33 of the channel profile element 3 due to its design projecting laterally towards the outside and against the direction of insertion of the luminaire cover 4 into the light passage opening 30 and can be held in a load-bearing manner, for example in the sense of a latching connection. The contact protrusion serves as a barb in the profile portion 33, which is designed here as an undercut, for securely and durably supporting the luminaire cover 4. Of course, other embodiments of the luminaire cover 4 are also conceivable.

Figure 14:
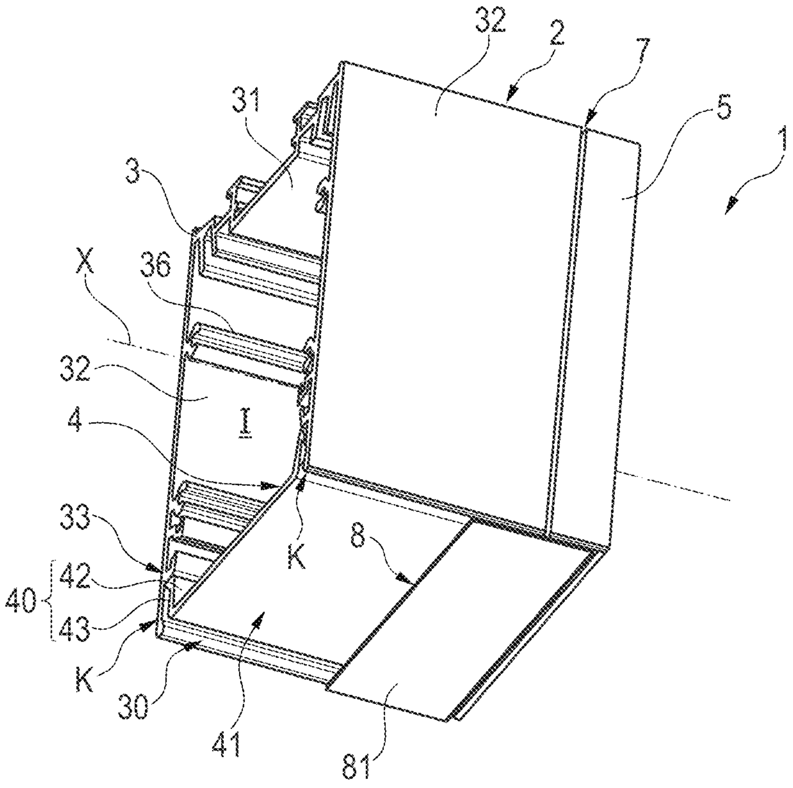
FIG. 14 is a perspective view of the elongated luminaire according to the invention according to FIG. 8 in a fully assembled state.
Figure 15:
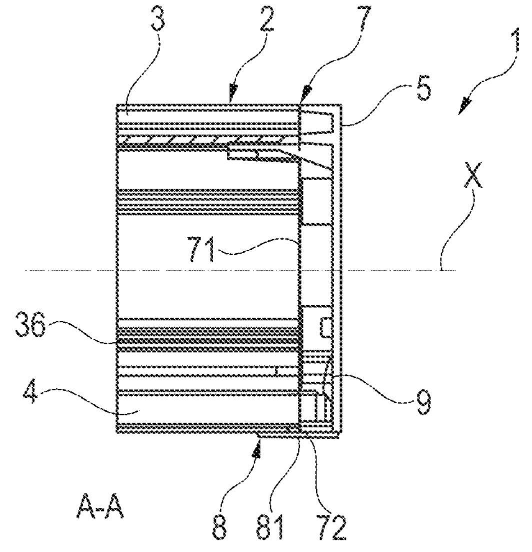
FIG. 15 is a lateral sectional view of the luminaire according to FIG. 14 along a vertical sectional line corresponding to the sectional line A-A in FIG. 1.

The luminaire 1 also has an end cap 5, which completely covers an end-side opening 20 (i.e., preferably here an axial opening) of the luminaire body 2 towards the luminaire interior I, as shown by way of example in FIGS. 14 and 15. The end-side opening 20 is preferably formed by an end-side end 34 of the channel profile element 3 along with an end-side end 44 of the luminaire cover 4.

The end cap 5 can preferably be manufactured by means of aluminum die-casting. The end cap 5 can also be made of a plastic material, for example as an injection-molded part.

The luminaire 1 can preferably also have a fastening means 6 for connecting and preferably releasably connecting the end cap 5 to the luminaire body 2—and here preferably its channel profile element 3. In the exemplary embodiment shown, as can be seen in particular in FIG. 8-11, a total of four fastening means 6 are provided here in the form of screws. These can then be fastened or screwed into corresponding fastening structures 36, for example extending along the inner wall of the channel profile element 3. The fastening means 6 preferably extends parallel to the longitudinal axis X. In particular, as shown, the fastening means 6 can have a fastening direction B parallel to the longitudinal axis X, as shown by way of example in FIG. 8-11.

The luminaire 1 also has a three-dimensionally and integrally shaped seal 7, as can be clearly seen in FIG. 1-7 in particular, but also in FIG. 8-13. The seal 7 is provided between the end cap 5 and the luminaire body 2 for sealingly covering the luminaire interior I, as can be seen in particular from FIG. 12-15.

The seal 7 is preferably made of silicone.

Figure 10:
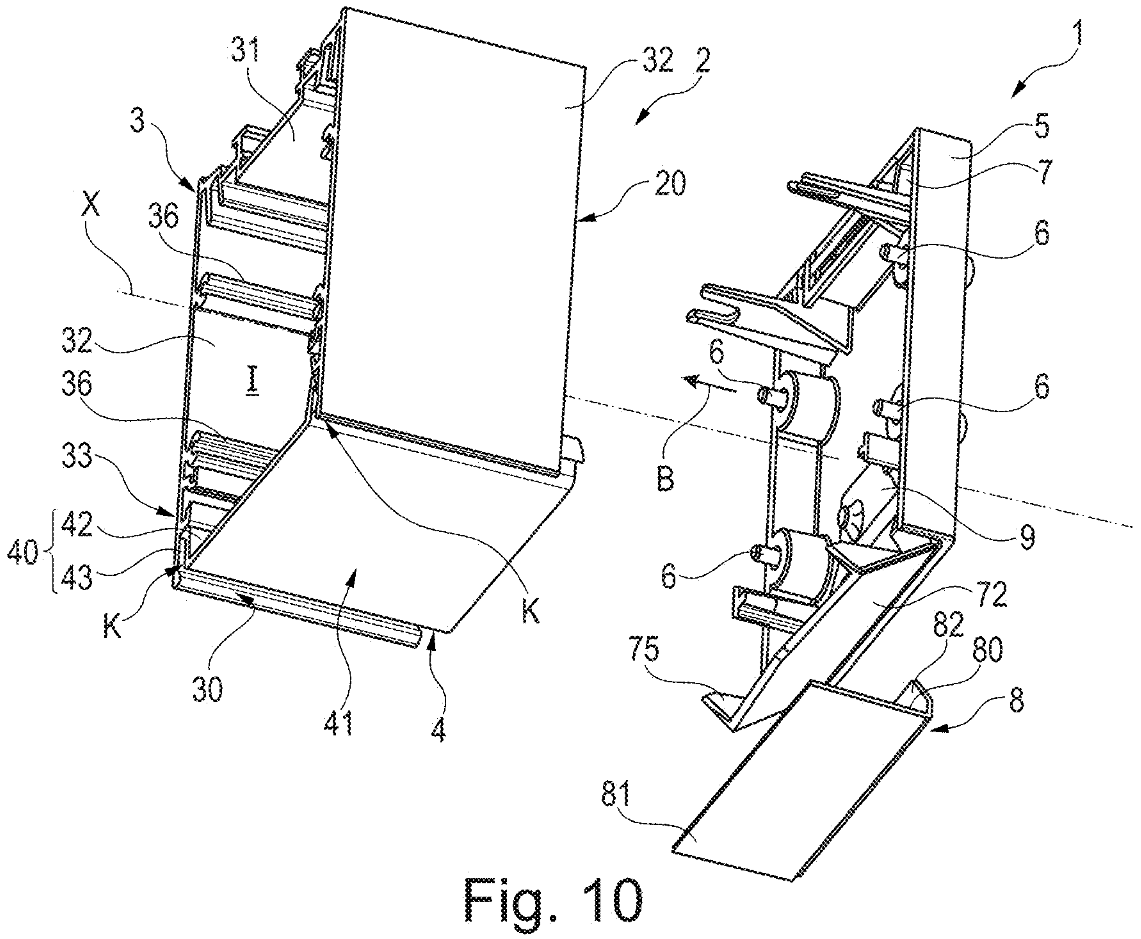
FIG. 10 is a perspective view of the elongate luminaire according to the invention according to FIG. 8 with a seal inserted into the end cap.
Figure 11:
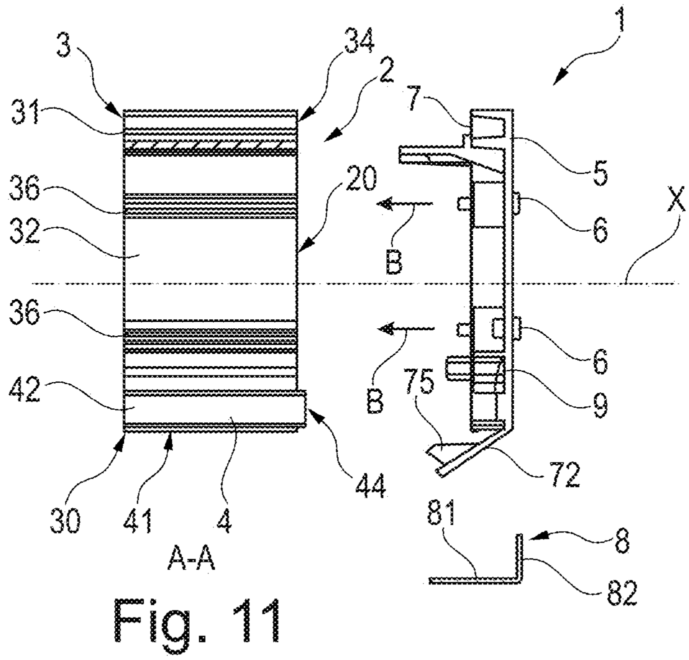
FIG. 11 is a lateral sectional view of the luminaire according to FIG. 10 along a vertical sectional line corresponding to the sectional line A-A in FIG. 1.

The end cap 5 can preferably have structural portions 50, 6 facing the luminaire body, in order to hold the seal 7 on the end cap 5 by positive and/or frictional locking, as can be seen for example in FIGS. 10 and 11. For example, at least some of the structural portions can be the fastening means 6 described above.

The seal 7 has a first sealing portion 71 for the circumferentially closed axial (sealing) seal between the luminaire body 2 and the end cap 5. Furthermore, the seal 7 has a second sealing portion 72 for the radial (sealing) seal of the contact regions K from the outside.

Figure 8:
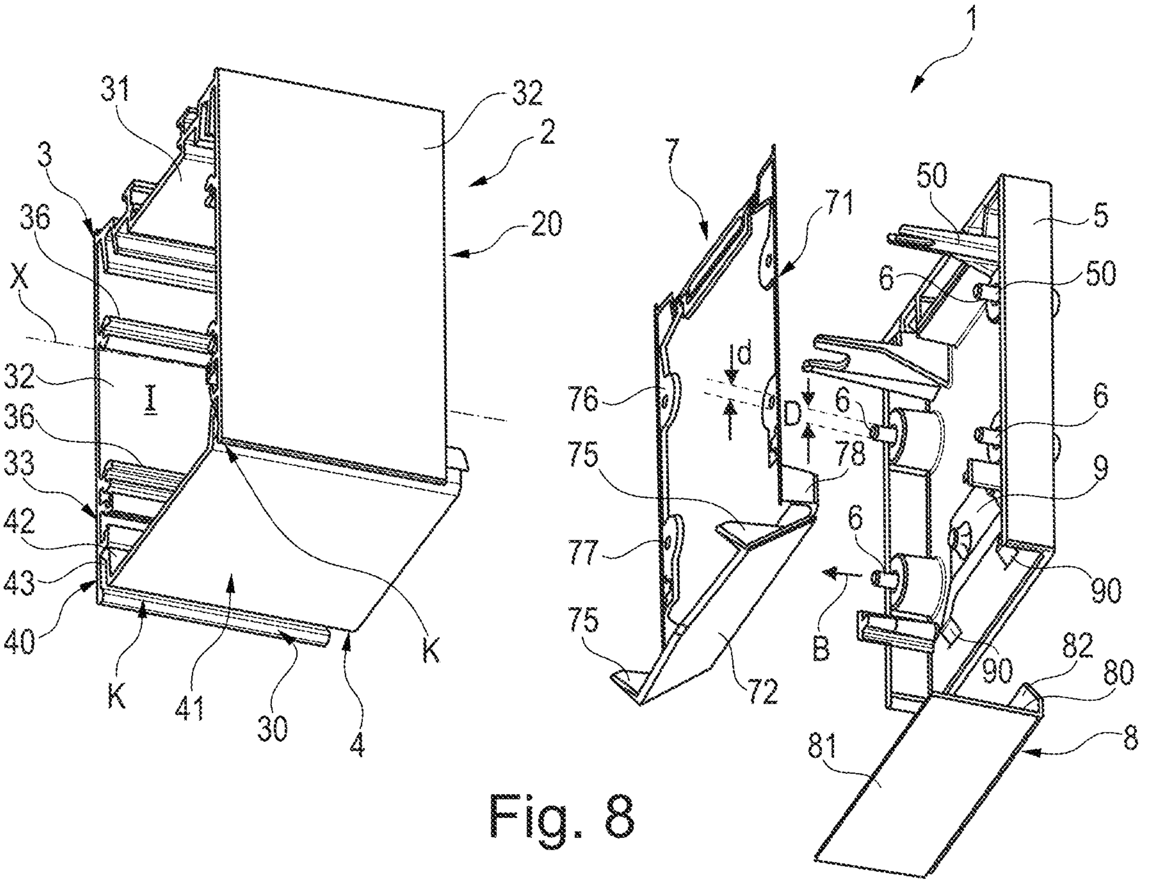
FIG. 8 is an exploded perspective view of an elongate luminaire according to an exemplary embodiment of the present invention with a seal according to FIG. 1.

The first sealing portion 71 preferably has a closed annular shape, as can be seen for example in FIGS. 1 and 8. The first sealing portion 71 can preferably radially surround the longitudinal axis X in a closed manner, as can be seen in particular in FIG. 8.

The first sealing portion 71 preferably has a shape corresponding to the cross-sectional shape of the luminaire body 2, preferably in the region of the end-side opening 20, as can be seen for example in FIG. 8.

As can be seen in FIG. 10, for example, the fastening means 6 can be guided through a fastening region 76 of the seal 7—here, the first sealing portion 71. The fastening region 76 preferably surrounds the fastening means 6 in a radially sealing manner, as can also be seen in FIG. 10.

The fastening region 76 can preferably have a defined passage opening 77 for the fastening means 6 to pass through. The passage opening 77 preferably has a diameter d, which is smaller than a diameter D of the fastening means 6, as can be seen for example in FIG. 8.

Figure 5:
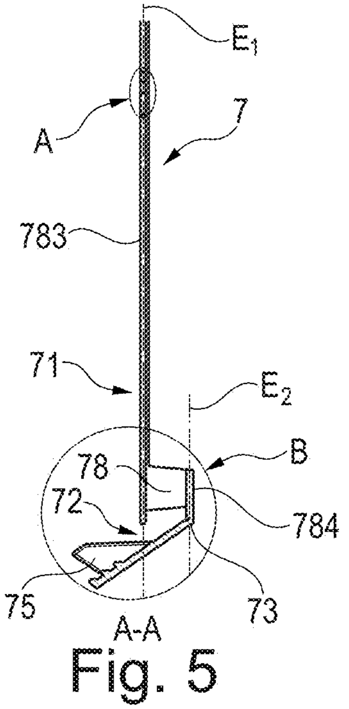
FIG. 5 is a lateral sectional view of the seal according to FIG. 1 along the sectional line A-A.
Figure 2:
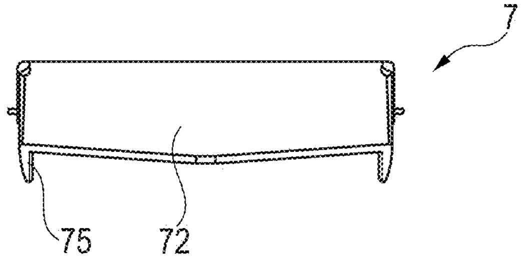
FIG. 2 is a bottom view of the seal according to FIG. 1.
Figure 6:
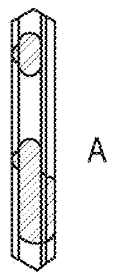
FIG. 6 is a detail A of the seal according to FIG. 5.
Figure 9:
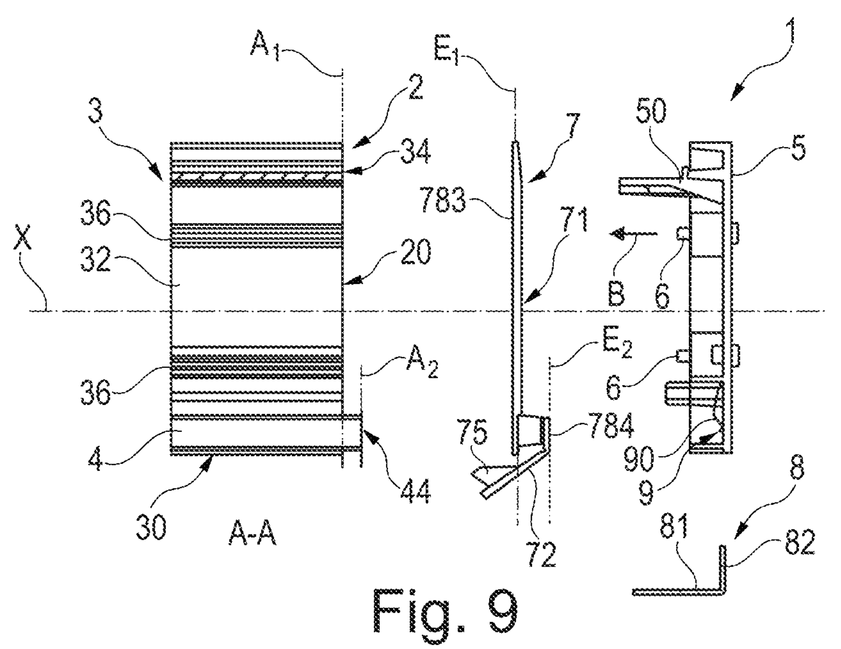
FIG. 9 is a lateral sectional view of the luminaire according to FIG. 8 along a vertical sectional line corresponding to the sectional line A-A from FIG. 1.

The first sealing portion 71 preferably extends substantially in one plane or in a plurality of (preferably parallel) planes $E_1$, $E_2$, as can be seen for example in FIG. 5. The plane or planes $E_1$, $E_2$ is/are preferably oriented perpendicularly to the longitudinal axis X. With reference to FIG. 9, the plane E or the planes $E_1$, $E_2$ preferably extend parallel to a plane $A_1$, $A_2$ spanned by the end-side opening 20 or by the end-side end 34 of the channel profile element 3 and/or by the end-side end 44 of the luminaire cover 4.

The first sealing portion 71 can basically have sealing portions 78 protruding from the plane or planes $E_1$, $E_2$ corresponding to the sealing contour of the end cap 5 and the luminaire body 2 (or the end-side ends 34, 44 of the channel profile element 3 and the luminaire cover 4 defining the end-side opening 20). As shown, for example, in FIGS. 5 and 7-9, these sealing portions 78 can connect the regions (here, first region 783 for axially sealing contact with the end-side end 34 of the channel profile element 3; second region 784 for axially sealing contact with the end-side end 44 of the luminaire cover 4) of the first sealing portion 71 to one another in a closed manner, as shown here by way of example in a plurality of planes E1, E2, in order to reproduce the contour of the end-side opening 20 or the end-side ends 34, 44 surrounding it and to provide a secure circumferential first sealing portion 71.

Figure 7:
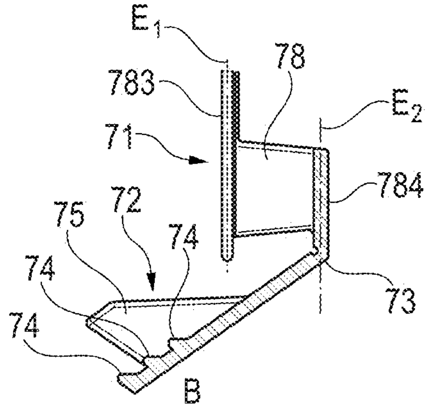
FIG. 7 is a detail B of the seal according to FIG. 5.

As can be seen in FIGS. 1, 5 and 7, for example, the first sealing portion 71 and the second sealing portion 72 can be connected to one another so that they can pivot relative to one another via a pivot portion 73. A pivot axis S of the pivot portion 73, as shown by way of example in FIG. 1, can preferably be oriented perpendicularly to the longitudinal axis X, which in FIG. 1 extends perpendicularly to the drawing plane.

Figure 12:
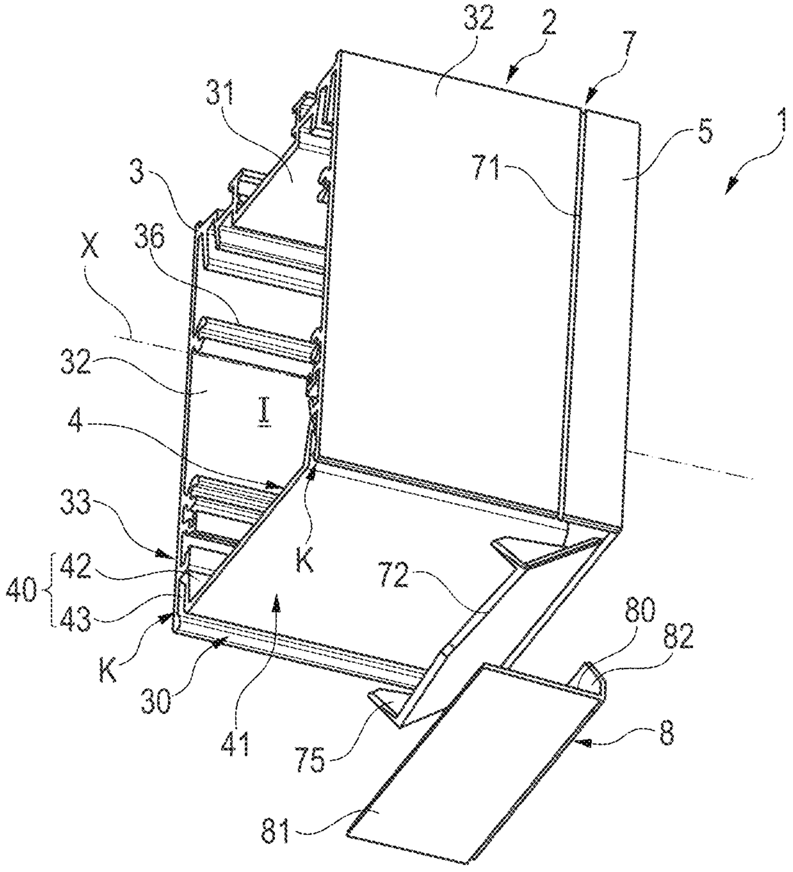
FIG. 12 is a perspective view of the elongate luminaire according to the invention according to FIG. 8 in a state that is still further assembled compared to FIG. 10; here with the first sealing portion clamped between the end cap and the light body and the contact portion not yet fastened.
Figure 13:
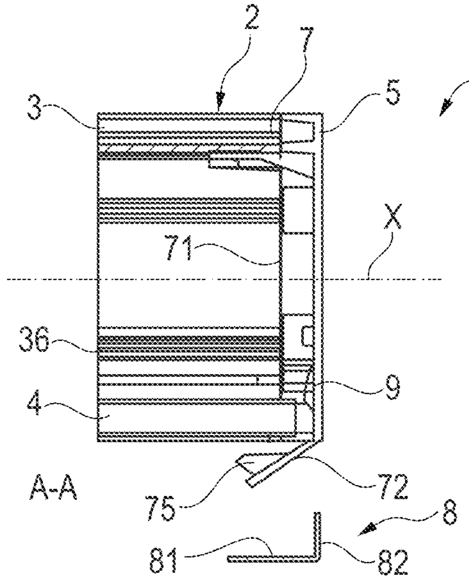
FIG. 13 is a lateral sectional view of the luminaire according to FIG. 12 along a vertical sectional line corresponding to the sectional line A-A from FIG. 1.

The second sealing portion 72 can project from the first sealing portion 71 towards the luminaire body 2 and partially overlap the luminaire body 2 laterally on the outside, as can be seen in particular in FIGS. 12, 13 and 15. Thus, the second sealing portion 72 can extend axially in the fully installed state of the seal 7 or project axially from the first sealing portion 71 accordingly.

The second sealing portion 72 preferably projects at an angle towards the outside from the first sealing portion 71 in the uninstalled state; thus radially and axially. This can be seen, for example, in FIGS. 5 and 7-13.

The second sealing portion 72 is preferably provided at least on one side of the luminaire body 2 having the luminaire cover 4, as can be seen in particular in FIG. 8-13 (there, the lower side of the luminaire body 2).

The second sealing portion 72 can preferably extend circumferentially around at least the luminaire cover 4 and the adjacent contact regions K with respect to the longitudinal axis X, as can be seen for example in FIG. 12.

Figure 3:
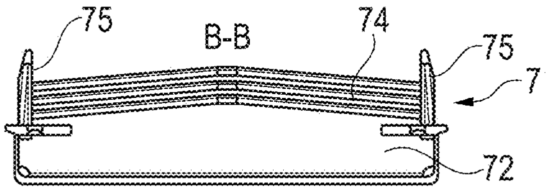
FIG. 3 is a sectional view of the seal according to FIG. 1 along the sectional line B-B.
Figure 4:
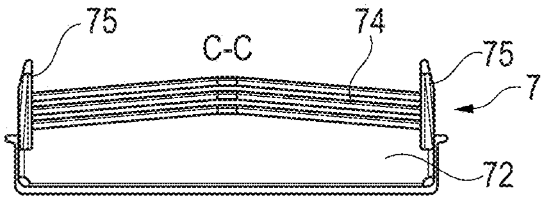
FIG. 4 is a sectional view of the seal according to FIG. 1 along the sectional line C-C.

The second sealing portion 72 can preferably have at least one sealing lip 74 projecting towards the luminaire body 2, which extends at least partially around the longitudinal axis X, as can be seen for example in FIGS. 3, 4 and 7.

As can also be seen from FIGS. 3, 4 and 7, the second sealing portion 72 can have a plurality of sealing lips 74, which are provided here in a plurality of rows arranged axially one behind the other or are arranged in rows one behind the other as the distance from the first sealing portion 71 or the pivot portion 73 increases.

The relevant sealing lip 74 can preferably run at least partially at an angle to the longitudinal axis X, as shown in FIGS. 3 and 4. The relevant sealing lip 74 can be designed with mirror symmetry with respect to a symmetry plane having the longitudinal axis X and centrally intersecting the second sealing portion 72.

The relevant sealing lip 74 preferably extends between the contact regions K in the assembled state in such a way that it is increasingly spaced apart from the first sealing portion 71 as the distance to the contact regions K increases. In a special embodiment, the relevant sealing lip 74 can be arrow-shaped, directed away from the first sealing portion 71, as can be seen by way of example in FIGS. 3 and 4.

As can be seen from FIGS. 5 and 7-13, the second sealing portion 71 can have protrusion portions 75, which sealingly project between the channel profile element 3 and the luminaire cover 4 in the region of the respective contact regions K, as can be seen from a combined view of FIG. 12-15.

The protrusion portions 75 preferably project in the direction of the longitudinal axis X on both sides of the second sealing portion 72 and/or on both sides of the luminaire cover 4, as can be seen in particular in FIG. 12. The protrusion portions 75 preferably project towards the luminaire interior I.

The luminaire 1 can also have a contact portion 8, as shown by way of example in FIG. 8-15. The contact portion 8 serves to press the second sealing portion 72 towards the luminaire body 2; preferably at least for radial pressing towards the luminaire body 2.

The contact portion 8 can preferably be held on the end cap 5, as can be seen by way of example in FIG. 15. Particularly preferably, the contact portion 8 can be held releasably on the end cap 5.

The end cap 5 can preferably have a holding means 9, in order to hold the contact portion 8. The holding means 9 can be a latching spring, as can be seen for example in FIG. 8. The contact portion 8 can then preferably be held in a latching manner by means of such a latching spring 9. For this purpose, this latching spring 9 has latching spring protrusions 90, which engage in corresponding latching receptacles 80 of the contact portion 8, in order to hold the contact portion 8 securely and durably and preferably also releasably.

In an alternative embodiment not shown here, the contact portion 8 can also be designed integrally with the end cap 5.

As can be seen in particular from FIG. 8-15, the contact portion 8 can preferably be designed as an angle. The angle preferably has an axially extending contact leg 81 for pressing the second sealing portion 72 towards the luminaire body 2 (see FIGS. 14 and 15) and a preferably substantially radially extending holding leg 82 for holding the contact portion 8 on the end cap 5, preferably via the holding means 9. The holding leg 82 can then preferably have the previously described latching recesses 80.

The contact portion 8 can preferably be made of sheet metal or plastics material.

The contact portion 8 or, if present, at least its contact leg 81 can completely cover the second sealing portion 72 or at least the region of the seal 7 facing the same side as the luminaire cover 4 towards the outside (preferably towards the front with respect to the luminaire 1; in FIGS. 8 to 15 at the bottom), as can be seen in particular from the representations in FIGS. 14 and 15.

Thus, it is possible to create an elongate luminaire 1 in a simple manner, which can be provided easily—even at the operation site—and can also have a high and secure sealing function.

For example, the elongate luminaire 1 can be transported to the use site in individual parts. A corresponding channel profile element 3 can be used directly there. It is also conceivable to initially cut the channel profile element 3 to a desired length. A plurality of channel profile elements 3 can also be lined up lengthwise along the longitudinal axis X. The elongate luminaire cover 4 can be inserted accordingly. If necessary, this can be cut to length and/or lined up according to the length of the channel profile element 3 or plurality of channel profile elements 3 lined up next to one another. The luminaire cover 4 is then preferably inserted into the corresponding structural receptacles (for example, the profile portions 33) on the sides of the channel profile element 3 by means of the fastening profile 40, so that the channel profile element 3 is arranged with the luminaire cover 4 via the elongate contact regions K and these are preferably connected in a sealing and/or load-bearing manner.

Corresponding lighting means, such as LEDs or LED modules, and possibly corresponding driver electronics and other components, such as sensors and the like, are preferably inserted into the luminaire body 2 prior to the attachment of the luminaire cover 4.

Corresponding end caps 5 and seals 7 are then provided for the end-side openings 20 of the luminaire body 2 provided in this manner. The fastening means 6, for example, can be inserted into the end caps 5. These can then also serve, for example, as positioning for the seal 7. This state is shown by way of example in FIGS. 8 and 9.

The seal 7 is then preferably pushed onto the fastening means 6 by means of its fastening regions 76 via the passage openings 77 and thus securely positioned and held. This state is shown by way of example in FIGS. 10 and 11.

The end cap 5 together with the seal 7 is then placed on the end side of the end-side opening 20 of the luminaire body 2 and preferably screwed axially into the fastening structures 36 by means of the fastening means 6, thus clamping the seal 7 between the end cap 5 and the luminaire body 2 to form an axial seal, as shown in FIGS. 12 and 13.

In a final step of the illustrated exemplary embodiment, the contact portion 8, designed here as an angle, is then inserted with its holding leg 82 into the end cap 5, so that preferably the latching receptacles 80 of the contact leg 8 come into latching connection with the latching spring protrusions 90 of the holding means 9 in order to hold the contact portion 8 securely. During insertion, the contact leg 81 of the contact portion 8 presses the second sealing portion 72 radially against the luminaire body 2. In the exemplary embodiment shown, the protrusion portions 75 are pressed onto the contact regions K and seal them. The sealing lips 74 are also pressed onto the luminaire cover 4 and preferably over the contact regions K onto the luminaire body 2, in order to allow a comprehensive sealing function. As shown in FIGS. 14 and 15, the seal 7 is preferably completely covered towards the front by the contact portion 8 or its contact leg 81.

The present invention is not limited by the exemplary embodiment described above, provided it is covered by the subject matter of the following claims.

The invention claimed is:

1. An elongate luminaire (1) which extends along a longitudinal axis (X), having a luminaire body (2) which delimits a luminaire interior (I) for receiving lighting means, wherein the luminaire body (2) has:

an elongate channel profile element (3) which extends along the longitudinal axis (X) and radially laterally circumferentially delimits the luminaire interior (I) apart from a longitudinally extending light passage opening (30), an elongate luminaire cover (4) for the passage of light from the lighting means, wherein the luminaire cover (4) is arranged in the light passage opening (30) along elongate contact regions (K) in order to surround the luminaire interior (I) together with the channel profile element (3) in a radially laterally circumferentially closed manner, an end cap (5) which completely covers an end-side opening (20) in the luminaire body (2) towards the luminaire interior (I), and a three-dimensionally and integrally formed seal (7) which is provided between the end cap (5) and the luminaire body (2) for sealingly covering the luminaire interior (I), wherein the seal (7) has:

a first sealing portion (71) for a circumferentially closed axial seal between the luminaire body (2) and the end cap (5), and a second sealing portion (72) extending outside the luminaire cover in the region of the end cap for sealing the contact regions (K) of the longitudinally extending light passage opening (30) in the profile element in the region of the end cap from the outside:

wherein the first sealing portion (71) and the second sealing portion (72) are connected to one another via a pivot portion (73) so that they can pivot relative to one another, wherein a pivot axis (S) of the pivot portion (73) is oriented perpendicularly to the longitudinal axis (X).

2. The elongate luminaire (1) according to claim 1, further having a fastening means (6) for releasably connecting the end cap (5) to the channel profile element (3) of the luminaire body (2)).

3. The elongate luminaire (1) according to claim 2, wherein the fastening means (6) extends parallel to the longitudinal axis (X), and/or wherein the fastening means (6) has a fastening direction (B) parallel to the longitudinal axis (X).

4. The elongate luminaire (1) according to claim 2, wherein the fastening means (6) is guided through a fastening region (76) of the seal (7), wherein the fastening region (76) surrounds the fastening means (6) in a radially sealing manner.

5. The elongate luminaire (1) according to claim 4, wherein the fastening region (76) has a defined passage opening (77) for the fastening means (6) to pass through, wherein the passage opening (77) has a diameter d that is smaller than a diameter D of the fastening means (6).

6. The elongate luminaire (1) according to claim 1, wherein the first sealing portion (71) has a closed annular shape, radially surrounding the longitudinal axis (X) in a closed manner, and/or wherein the first sealing portion (71) has a shape corresponding to the cross-sectional shape of the luminaire body (2) in the region of the end-side opening (20).

7. The elongate luminaire (1) according to claim 1, wherein the first sealing portion (71) extends substantially in one plane or in a plurality of planes ($E_1$, $E_2$), which is/are oriented perpendicularly to the longitudinal axis (X), and/or which extends/extend parallel to a plane (A) spanned by the end-side opening (20).

8. The elongate luminaire (1) according to claim 1, wherein the second sealing portion (72) projects from the first sealing portion (71) towards the luminaire body (2) and partially overlaps the luminaire body (2) laterally on the outside.

9. The elongate luminaire (1) according to claim 1, wherein the second sealing portion (72) projects at an angle towards the outside from the first sealing portion (71) in the uninstalled state.

10. The elongate luminaire (1) according to claim 1, wherein the second sealing portion (72) is provided at least on one side of the luminaire body (2) having the luminaire cover (4).

11. The elongate luminaire (1) according to claim 1, wherein the second sealing portion (72) extends circumferentially with respect to the longitudinal axis (X), spanning at least the luminaire cover (4) and the adjacent contact regions (K).

12. The elongate luminaire (1) according to claim 1, wherein the second sealing portion (72) has at least one sealing lip (74) projecting towards the luminaire body (2), which extends at least partially around the longitudinal axis (X).

13. The elongate luminaire (1) according to claim 12, wherein the sealing lip (74) runs at least partially at an angle to the longitudinal axis (X), and/or wherein the sealing lip (74) is designed with mirror symmetry with respect to a symmetry plane having the longitudinal axis (X) and centrally intersecting the second sealing portion (72).

14. The elongate luminaire (1) according to claim 12, wherein the sealing lip (74) extends between the contact regions (K) in such a way that it is increasingly spaced from the first sealing portion (71) as the distance from the contact regions (K) increases, and/or wherein the sealing lip (74) is shaped like an arrow pointing away from the first sealing portion (71).

15. The elongate luminaire (1) according to claim 12, wherein the second sealing portion (72) has a plurality of sealing lips (74), which are provided in a plurality of rows arranged axially one behind the other.

16. The elongate luminaire (1) according to claim 1, wherein the second sealing portion (72) has protrusion portions (75) that sealingly project between the channel profile element (3) and the luminaire cover (4) in the region of the respective contact regions (K).

17. The elongate luminaire (1) according to claim 16, wherein the protrusion portions (75) project when viewed in the direction of the longitudinal axis (X) on both sides of the second sealing portion (72) and/or on both sides of the luminaire cover (4), towards the luminaire interior (I).

18. The elongate luminaire (1) according to claim 1, further having a contact portion (8), which presses the second sealing portion (72) towards the luminaire body (2), at least radially.

19. The elongate luminaire (1) according to claim 18, wherein the contact portion (8) is releasably held on the end cap (5).

20. The elongate luminaire (1) according to claim 19, wherein the end cap (5) has a holding means (9) comprising a latching spring, in order to hold the contact portion (8) in a latching manner.

21. The elongate luminaire (1) according to claim 18, wherein the contact portion (8) is integrally designed with the end cap (5).

22. The elongate luminaire (1) according to claim 18, wherein the contact portion (8) is designed as an angle with an axially extending contact leg (81) for pressing the second sealing portion (72) towards the luminaire body (2) and a substantially radially extending holding leg (82) for holding the contact portion (8) on the end cap (5).

23. An elongate luminaire (1) according to claim 18, wherein the contact portion (8) is made of sheet metal or plastics material.

24. An elongate luminaire (1) according to claim 18, wherein the contact portion (8) completely covers the second sealing portion (72) or at least the region of the seal (7) facing the same side as the luminaire cover (4) towards the outside.

25. The elongate luminaire (1) according to claim 1, wherein the end cap (5) has structural portions (50) facing the luminaire body (2), in order to hold the seal (7) on the end cap (5) by positive and/or frictional locking.

26. The elongate luminaire (1) according to claim 1, wherein the seal (7) is made of silicone.

27. The elongate luminaire (1) according to claim 1, wherein the channel profile element (3) has a substantially U-shaped cross section when viewed in the direction of the longitudinal axis (X).

28. The elongate luminaire (1) according to claim 1, wherein the light passage opening (30) extends longitudinally over the entire length of the channel profile element (3).

29. The elongate luminaire (1) according to claim 1, wherein the channel profile element (3) and the luminaire cover (4) are connected along the elongate contact regions (K) in a sealing and load-bearing manner, wherein the luminaire cover (4) has fastening profiles (40) extending longitudinally for sealing contact and load-bearing connection to the channel profile element (3).

* * * * *